No. 770,474. PATENTED SEPT. 20, 1904.
A. K. OLSON.
SPOKE PULLER.
APPLICATION FILED OCT. 1, 1903.
NO MODEL.

WITNESSES:
J. H. Blackwell
E. Dexter

Andrew Kristian Olson
INVENTOR

BY A. A. Anderson
ATTORNEY

No. 770,474. Patented September 20, 1904.

UNITED STATES PATENT OFFICE.

ANDREW KRISTIAN OLSON, OF HUBBARD, OREGON.

SPOKE-PULLER.

SPECIFICATION forming part of Letters Patent No. 770,474, dated September 20, 1904.

Application filed October 1, 1903. Serial No. 175,410. (No model.)

*To all whom it may concern:*

Be it known that I, ANDREW KRISTIAN OLSON, of the town of Hubbard, county of Marion, State of Oregon, have invented new and useful Improvements in Spoke-Pullers, of which the following is a specification.

My invention relates to a spoke-puller used to extract spokes from wheel-hubs.

The object of my invention is to provide a new, labor-saving, simple but efficient spoke-puller arranged so that wooden spokes of any size, shape, and length, including spokes broken off next the hub, can be easily and rapidly pulled from any size of wooden wheel-hubs without injuring the hub or other spoke of the wheel.

My invention consists of novel features and parts and combinations of the same, as will be more readily understood by reference to the accompanying drawings, forming a part of this specification, in which similar characters of reference indicate corresponding parts in all the views, in which—

Figure 1:
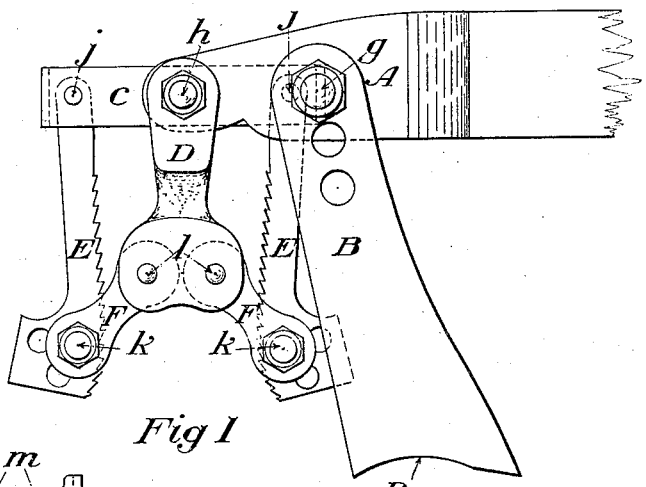
Figure 3:
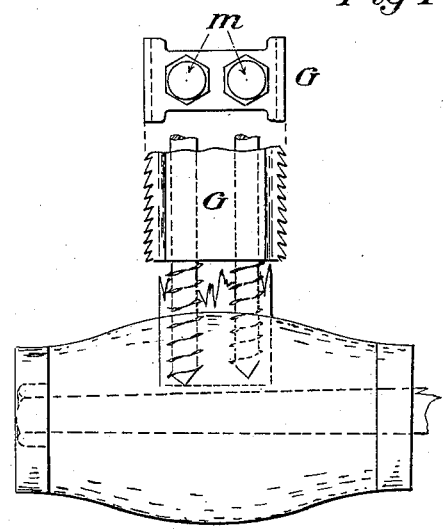
Figure 2:
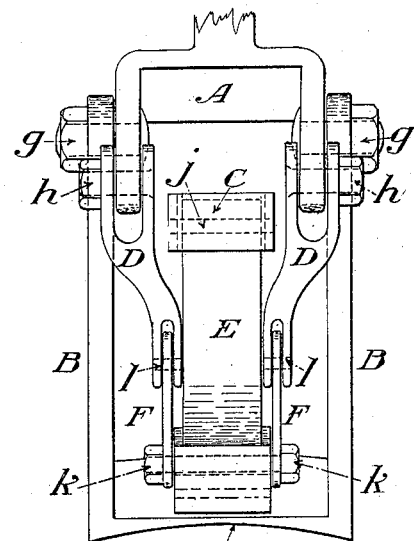
Figure 4:
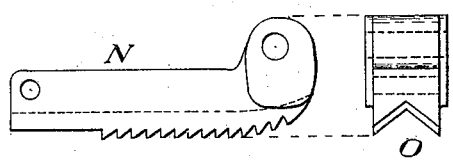

Figure 1 is a perspective view of the spoke-puller seen from the side with the jaws open ready to place the jaws over a spoke. Fig. 2 is a view of the spoke-puller seen from the front with the lever perpendicular. Fig. 3 shows the lifting-block G screwed into a spoke broken off too close to the hub to admit the jaws to take hold of the spoke. Fig. 4 shows side and end views of jaws used when the spokes are oval or very small.

As shown in the drawings, B represents the frame or framework, which is open at the top. Each of the sides of the frame B has three or more holes near the top ends to admit the lever A to be raised or lowered, by means of which I secure better adjustment than I could otherwise secure. The bottom of the frame B is solid and of concave shape both lengthwise B' and crosswise B². By reason of this shape of the bottom of the frame it can be made to rest equally well on the ends and the sides of the hub. A, Fig. 1, represents the lever, which is made in shape of a U at one end, Fig. 2, with handle at other end, and works easily on bolts $g$, Fig. 1 and Fig. 2. There are two holes in each of the sides of the U end of the lever A, one of which is at the ends where the bolt $h$ is put through and the other is where the lever A is hung onto the upper ends of the frame B. The handle of the lever A can be made of any desirable length, but is shown broken off in the drawings.

C represents a solid frame, with a hole near each end of each of its sides. This frame C is made of sufficient width and length so that when the jaws E are hung inside of it, one jaw at each end, a wooden spoke of any size can pass up between the jaws and inside the frame.

E represents two jaws made in the shape shown in the drawings, each jaw having a row of teeth on its inside, as shown in Fig. 1, and are rounded back at the lower end. The teeth fasten into the spokes when the spoke-puller is working, and thus holds onto the spoke, and the rounding of the jaws at the lower end of each of them makes it possible for the jaws to hold the spoke much better when the spoke is being pulled out than if the jaws were straight. The jaws E are pivoted on bolts J at their upper ends, one to each end of the frame C and inside said frame. The jaws E are pivotally attached at their lower ends to the links F by means of the bolts $k$ and are provided with a series of holes, three being shown in Fig. 1, to admit of adjustment to spokes of different sizes. The links F are pivotally connected to the arms D by bolts $l$. The arms D are slotted at each end and are bent outward at the upper end, as shown, and have said upper end attached to the lever A by bolts $h$. It will be seen from this construction that the jaws E will open and close with the raising and lowering of the lever A. The arms D and links F thus connected are two in number and connected one on each of the U ends of the lever A by means of the bolt $h$, so that the upper end of the arms D swing easily on the bolts $h$, and the lower ends of the links F are connected with the lower ends of the jaws E by means of bolts $k$. Thus the jaws E will open and close with the lowering and raising of the lever A. The upper part of the arms D are bent, as shown in D, Fig. 2, both ends of D being made in U shape, the upper ends to admit of the end of the lever where the bolts $h$ are shown in the drawings and the lower end of the arms D to admit of the upper end of the links F where pivots are shown in drawings. By reason of these bends in the upper part D of the arms I secure free and easy movements up and down of the jaws E and the frame C between the arms D without the frame C interfering with the movements of part D of the arms.

In Fig. 4, N is a side view of jaws used and connected in the same manner as jaws E; but there is only one hole in the lower part of the jaws N to connect the lower part of the links F with the bolts $k$, and the inside of the jaws N are made dovetail, having two rows of teeth in the dovetailed side, sitting at right angles to each other, as shown in O; otherwise the jaws N are constructed the same as jaws E. These jaws N are used to pull small and oval spokes and are in such cases used to replace the jaws E.

As shown in Fig. 3, G is a lifting-block, with teeth in two sides and two holes running through the block from end to end. Through these holes are passed screw-bolts $m$. The upper part of the block G is shown broken off to show the heads of the screw-bolts $m$.

The wheel-hub in Fig. 3 is shown with a spoke broken off near the hub. The block G is attached to this piece of spoke left in the hub by screwing it onto the piece of spoke with the screw-bolts $m$.

To use the puller for extracting spokes, I place the puller over the spoke, so that the spoke is between the jaws E and the arms D and links F. The spoke will thus pass inside the frame C if the spoke is long enough to reach to the frame C. I then place the bottom end of the frame B on the hub and press down on handle of the lever A. This pulls up at the top of part D of the arms and draws the lower part of part F of the arms together, pulling the jaws E firmly into the spoke, and thus I lift the spoke out of the hub. If the dovetailed jaws N O can be used to more advantage by reason of the size and shape of the spoke, then I use them instead of jaws E. When the spoke is broken off so near the hub that the jaws cannot get hold of the spoke, I screw the block G, Fig. 3, onto the spoke and place the jaws E over the block G in the same manner as I place the jaws over a spoke, and then I proceed to pull the broken piece of the spoke out in the manner hereinbefore set out when pulling a larger spoke.

The handle of the lever A can be made either of wood or iron. All other parts are made of iron and steel. I prefer to make the lifting-block G of malleable iron, the screws $m$ and the jaws E and N of steel.

Having thus described my invention, I claim as new and desire to secure by Letters Patent—

1. A spoke-puller, comprising a frame B, a lever pivoted between the sides of the frame at the upper end, arms pivotally mounted on said lever, jaws, a frame C pivotally connected with the upper ends of the jaws and from which said jaws are pivotally suspended, pivotal link connections between said jaws and arms and means for adjusting said pivotal connections.

2. A spoke-puller comprising a frame B with a lower face concave both longitudinally and transversely, a lever pivotally mounted between the upper ends of the sides of said frame, arms pivotally mounted on said lever, a frame C, jaws, pivotally suspended from said frame and links connecting said jaws and arms.

3. A spoke-puller comprising a frame B having concave lower face, a lever pivoted between the sides of the frame at the upper end, arms pivotally mounted on said lever, jaws, a frame C pivotally connected with the upper ends of the jaws, links pivotally connecting said jaws and arms, and means for adjusting said links for spokes of different sizes.

4. A spoke-puller comprising a frame B, a lever pivoted between the sides of said frame at the upper end thereof, arms pivotally mounted on said lever, jaws and links pivotally connected with said jaws and arms, said arms being slotted and bent outwardly at their upper ends, and a frame C carried by said jaws independent of said levers and arms.

In testimony whereof I have hereunto signed my name to the specification, in the presence of two witnesses, the 25th day of September, A. D. 1903.

ANDREW KRISTIAN OLSON.

Witnesses:
   CHAS. MATTOCKS,
   W. S. HURST.